United States Patent [19]
Staats

[11] 3,961,152
[45] June 1, 1976

[54] MAGNETRON POWER SUPPLY AND CONTROL CIRCUIT

[75] Inventor: James E. Staats, Louisville, Ky.

[73] Assignee: General Electric Company, Louisville, Ky.

[22] Filed: Nov. 21, 1974

[21] Appl. No.: 525,856

Related U.S. Application Data

[62] Division of Ser. No. 430,730, Jan. 4, 1974, Pat. No. 3,855,440.

[52] U.S. Cl. .......... 219/10.55 B; 321/15
[51] Int. Cl.[2] .......... H05B 9/06
[58] Field of Search .......... 219/10.55 B; 321/15

[56] References Cited

UNITED STATES PATENTS

| | | | |
|---|---|---|---|
| 3,046,466 | 7/1962 | Tyrrell et al. | 321/15 X |
| 3,129,312 | 4/1964 | Ojelid | 219/10.55 B |
| 3,308,390 | 3/1967 | Crapuchettes | 219/10.55 B X |
| 3,651,371 | 3/1972 | Tingley | 219/10.55 B |
| 3,684,978 | 8/1972 | Otaguao | 219/10.55 B |
| 3,821,594 | 6/1974 | Webb et al. | 219/10.55 B |

FOREIGN PATENTS OR APPLICATIONS

| | | | |
|---|---|---|---|
| 1,273,056 | 7/1968 | Germany | 219/10.55 B |

*Primary Examiner*—Bruce A. Reynolds
*Attorney, Agent, or Firm*—Prangley, Dithmar, Vogel, Sandler & Stotland

[57] ABSTRACT

A counter-top microwave oven comprises an upstanding box-like metal wall structure defining a heating cavity, a microwave generator including a voltage quadrupler power supply, and transmission means including a probe antenna for radiating the microwaves into the heating cavity, the cavity being so dimensioned and the antenna being so positioned as to excite in said cavity preferred electromagnetic field modes for establishing preferred field patterns to achieve uniform heating of a variety of foods. The power supply includes capacitive and inductive means, having values designed to optimize the power factor, and switching means for selectively switching between low and high power modes. The heating cavity is dimensioned to produce two complementary modes of which establish an undistorted field pattern providing uniform heating over a distance greater than a wavelength of the source microwave energy, tuning means being provided to tune undesired modes off resonance.

2 Claims, 9 Drawing Figures

20
23
29
27
55
35
66
28
21

20
22
41
42
43
30
33
44
38
27
34
37
36
40
26
25
46
45
61
50
35
55

23
20
31
29
77
21
40
22
43
60
33
38
61
47
64
54
28
70
32
52
24

39
31
λ/4
35

50
70
55
Lo
OFF
HI
Broil
L1
N
120v
60Hz
1Ø
C
C/2
Hi
Lo
OFF
HI
OFF
LO
51
52
53
54
55A
55B
55C
56
58
59
60
61
62
63
64
65
66
67
68
69
71
72
73
74
75
76
77
78
79
80
82
37
38
40

30
31
32
33
34
35
36
44
45
F
X
Y
Z
.633λ
1.1λ
1.2λ
TE1,1,1y & TE1,0,2z 30
33
34
35
36
85
X
Z 30
31
32
33
86
Y
Z 31
33
34
41
44
87
88

MAGNETRON POWER SUPPLY AND CONTROL CIRCUIT

CROSS-REFERENCE TO RELATED APPLICATION

This application is a division of application Ser. No. 430,730, filed Jan. 4, 1974, and now U.S. Pat. No. 3,855,440, issued Dec. 17, 1974.

BACKGROUND OF THE INVENTION

The present invention relates to electronic heating apparatus of the type commonly referred to as a microwave oven, and particularly to microwave ovens which can be placed atop a table or counter and which have a heating cavity with dimensions generally comparable to a wavelength of the microwave energy used. More specifically, the present invention relates to improved microwave ovens which can be operated on standard 120 volt a.c. household current without using a power transformer.

Microwave cooking is a complex problem and the heating characteristics for microwave ovens and for various types of foods have been mathematically determined for only the simplest cases. It is recognized, however, that the ability of a microwave oven to efficiently and uniformly cook a food load is dependent upon the electromagnetic field pattern which is established in the heating cavity. Normally, a microwave oven is adapted to operate at a predetermined ultrahigh frequency and, typically, a conventional microwave oven of arbitrary dimensions is found to have electromagnetic field modes near the desired wavelength. In practice, one of these modes, usually a transverse electric (TE) mode is excited in the heating cavity, and this mode is characterized by both high impedance and low impedance regions in the heating cavity. Generally, the position in the heating cavity in which food is normally placed lies in the high impedance region of the electromagnetic field pattern.

But most food items have a relatively low impedance in the range of 3 to 200 ohms and, typically, the food presents a series impedance with the standing wave impedance in the heating cavity so that heating occurs in the low impedance region of the wave pattern. Thus, when food is placed in the oven in a high impedance region or partially in a high impedance region and partially in a low impedance region, the result is that the food either does not heat or the heating is not uniform.

Heretofore, this problem was attacked by using rotating mode stirrers in the heating cavity to excite a large number of electromagnetic field modes in the hope that the combined effect of these modes would be to produce a more uniform heating pattern. Similarly, in the copending U.S. application Ser. No. 317,206, filed Dec. 21, 1972, now U.S. Pat. No. 3,798,404, issued Mar. 19, 1974, and the copending U.S. application Ser. No. 320,140, filed Jan. 2, 1973, now U.S. Pat. No. 3,823,295, issued July 9, 1974, both assigned to the assignee of the present invention, rotating mode exciters are utilized to excite and couple specific secondary modes to provide a more uniform time-averaged field distribution in the heating cavity. Alternatively, rotating turntable-type shelves have been provided in the heating cavity for supporting the food and moving the food through different regions of the field pattern so as to achieve a more uniform heating of the food. But all of these prior art attempts at improving the uniformity of heating in the microwave oven involve the use of moving parts which add to the complexity, the expense and the difficulty of maintenance of the electronic oven.

SUMMARY OF THE INVENTION

It is a general object of the present invention to provide an electronic heating apparatus characterized by a distortion-free electromagnetic field pattern which affords uniform heating of food without requiring a mode stirrer or turntable or the like. More particularly, it has been found that unique combinations of heating cavity dimensions and microwave antenna location will produce in the heating cavity preferred electromagnetic field modes which provide improved uniformity of heating of the food in its normal position in the heating cavity.

The present invention is also intended to provide an improved power supply for an electronic oven whereby the microwave generator can be operated on normal low voltage household current.

It is an important object of this invention is to provide electronic heating apparatus which includes a voltage converter having a pair of input terminals adapted to be connected to an associated low frequency a.c. supply source having a voltage in the general range of 110 to 125 volts and a pair of output terminals respectively connected to the input terminals of a crossed-field discharge device, the converter being characterized by the production of a d.c. output voltage across the output terminals thereof having a maximum amplitude approximately four times the peak value of the a.c. input voltage to the converter.

In connection with the foregoing object, it is another object of this invention to provide a voltage converter of the type set forth which includes four series-connected diodes, two input capacitors and two output capacitors, each of the input capacitors having the capacitance twice that of each of the output capacitors.

Still another object of this invention is to provide a voltage converter of the type set forth, which includes means for switching between a low power mode and a high power mode.

Further features of the invention pertain to the particular arrangement of the parts of the electronic heating apparatus whereby the above-outlined and additional operating features thereof are attained.

The invention, both as to its organization and the method of operation, together with further objects and advantages thereof, will best be understood by reference to the following specification taken in connection with the accompanying drawings.

DESCRIPTION OF THE PREFERRED EMBODIMENTS

Figure 1:
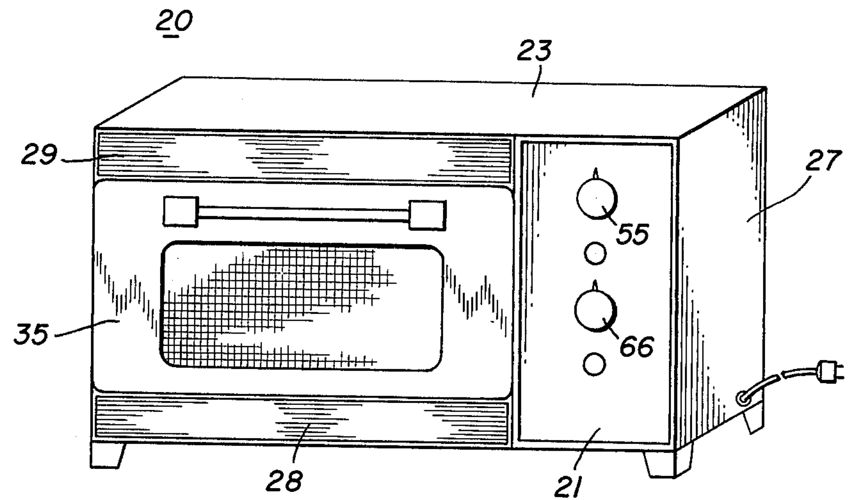
FIG. 1 is a front perspective view of an electronic heating apparatus constructed in accordance with and embodying the features of the present invention.
Figure 2:
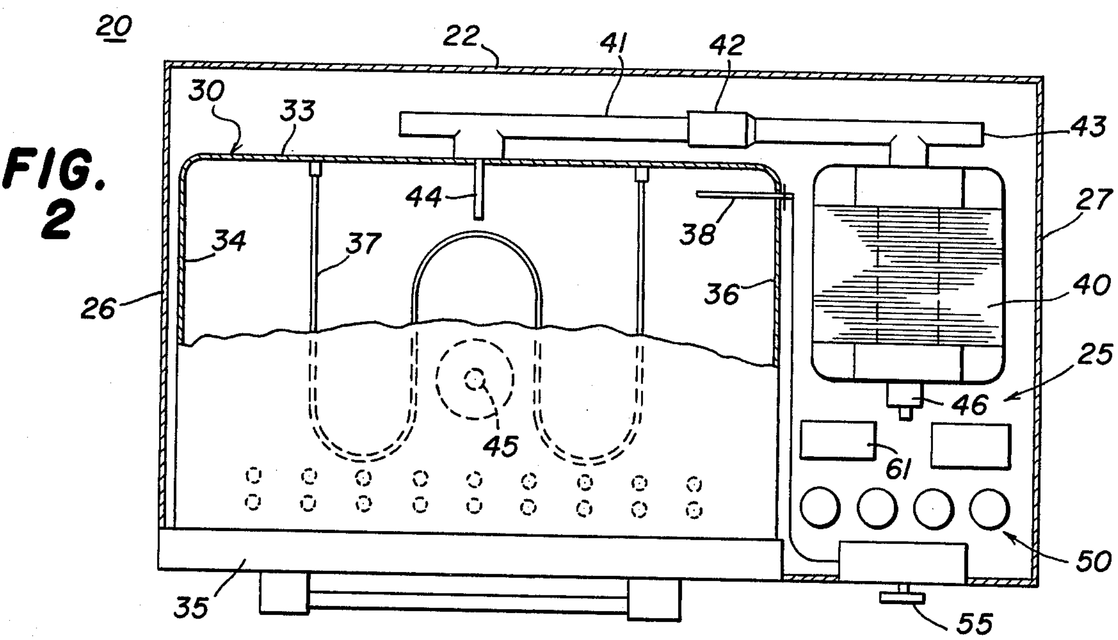
FIG. 2 is an enlarged horizontal cross-sectional view of the electronic heating apparatus of FIG. 1 with the top wall thereof removed, and with the top wall of the heating cavity partially broken away.

Referring now in particular to FIGS. 1 through 5 of the drawings, there is illustrated a microwave oven, generally designated by the numeral 20, constructed in accordance with and embodying the features of the present invention. The microwave oven 20 is adapted for placement on top of a table or counter and is housed in a cabinet which includes an upstanding front panel 21, a rear wall 22, a top wall 23, a bottom wall 24 and a pair of opposed sidewalls 26 and 27. Mounted within the oven cabinet alongside the front panel 21 is a heating enclosure, generally designated by the numeral 30, including a top wall 31, a bottom wall 32, a rear wall 33 and a pair of opposed sidewalls 34 and 36, the front of the heating enclosure 30 being closed by a door 35 which, in the closed position thereof, forms the front wall of the heating enclosure 30, which enclosure is generally in the form of a rectangular parallelepiped.

Thus, the heating enclosure 30 serves to separate the interior of the oven cabinet into a heating cavity defined within the heating enclosure 30 and a machinery compartment between the heating enclosure 30 and the oven cabinet walls 22, 23, 24 and 27. Closing the front of the oven cabinet between the walls 24 and 32 is an air intake screen 28 and closing the front of the oven cabinet between the walls 31 and 23 is an air exhaust screen 29.

Disposed within the heating enclosure 30 adjacent to the top wall 31 is a broil heating element 37. Mounted in the sidewall 36 of the heating enclosure 30 projecting inwardly of the heating cavity is a thermostat 38 which is electrically connected to a control knob on the front panel 21. The oven door 35 is provided around the periphery thereof with a groove or cavity 39 having an effective electrical length equal to one-fourth of the wavelength λ of the microwave energy supplied to the heating enclosure 30, thereby serving as a trap to prevent the escape of microwave energy from the heating enclosure 30 in use.

Mounted in the machinery compartment 25 is a magnetron 40 which may for example be of the type illustrated in U.S. Pat. No. 3,551,735 issued to James E. Staats on Dec. 29, 1970, and assigned to the assignee of the present invention. The magnetron 40 is adapted to produce microwave energy having a frequency of approximately 915 MHz. at the output terminals thereof whan a d.c. voltage of approximately 560 volts is applied to the input terminals thereof. Coupled to the output terminals of the magnetron 40 is a coupler and filter device 43, the input terminals of the magnetron 40 being provided with a filter 46, the filters 43 and 46 filtering out the higher harmonics of the fundamental frequency of the microwave output of the magnetron 40 and also serving to isolate the d.c. power supply from the microwave energy. The coupler and filter device 43 is coupled to a coaxial transmission line 41 by means of a capacitive coupling 42, the transmission line 41 in turn being coupled to a probe antenna 44 which projects through an opening in the rear wall 33 of the heating enclosure 30 into the heating cavity for radiating microwave energy thereinto. A transmission line 41 and the capacitive coupling 42 may be of the type illustrated in the U.S. Pat. No. 3,626,135 issued to Louis H. Fitzmayer on Dec. 7, 1971, and assigned to the assignee of the present invention. Mounted on the top wall 31 of the heating enclosure 30 and projecting downwardly into the heating cavity is a metallic tuning member 45 for a purpose to be described more fully hereinafter.

Figure 3:
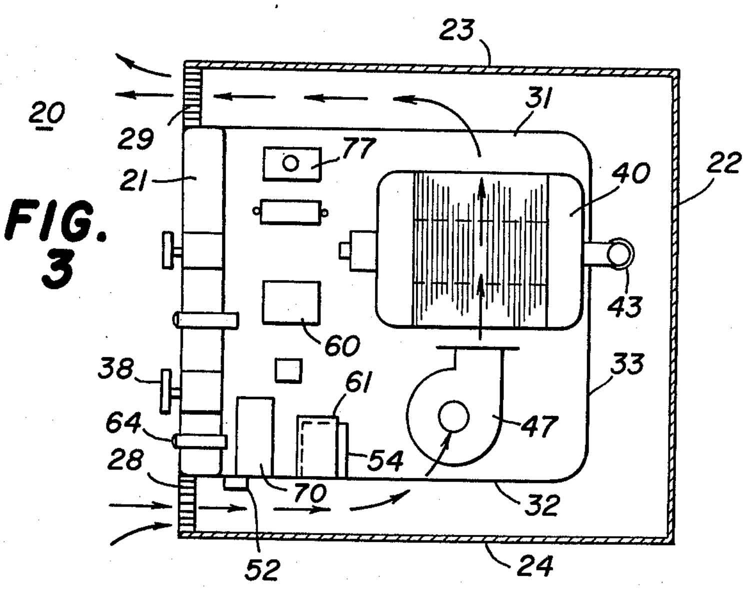
FIG. 3 is a view in vertical section of the electronic heating apparatus of FIG. 2 as viewed from the right-hand side thereof with the right-hand sidewall removed.
Figure 4:
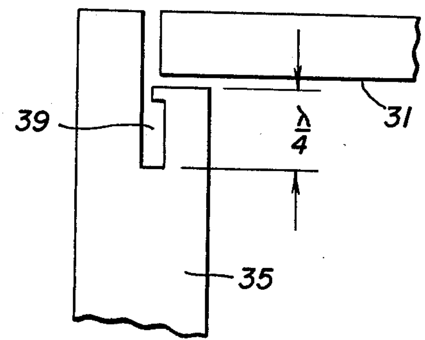
FIG. 4 is a further enlarged fragmentary diagrammatic view of the microwave trap in the door of the electronic heating apparatus of FIG. 1.
Figure 5:
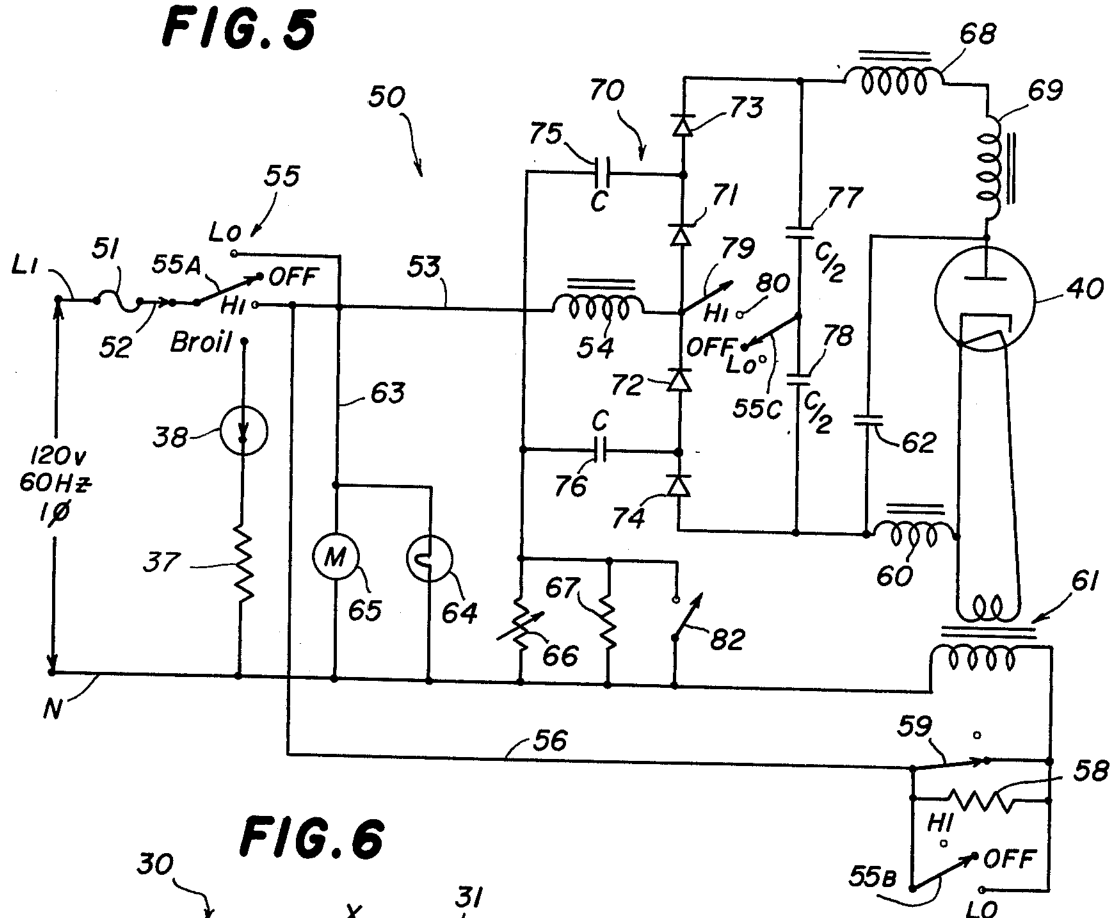
FIG. 5 is a schematic electrical circuit diagram of the control and the power supply circuitry of the electronic heating apparatus of FIG. 1.

Mounted in the machinery compartment 25 immediately beneath the magnetron 40 is a blower 47 adapted for drawing air in through the intake screen 28 and directing it over the mahcinery in the machinery compartment 25, in particular the magnetron 40, for cooling of the apparatus, the air then being exhausted through the exhaust screen 29, the cooling air stream being indicated by arrows in FIG. 3. Mounted in the machinery compartment 25 forwardly of the magnetron 40 is a control and power supply assembly, generally designated by the numeral 50, which is adapted to be connected between one power line $L_1$ and the neutral conductor N of a standard 220–240 volt 60 Hz. single-phase three-wire Edison supply network, the voltage between $L_1$ and N being in the range 110–120 volts.

Power line $L_1$ is connected through a fuse 51 to an interlock switch 52 which is in the door 35, the switch 52 being closed only when the door 35 is closed to insure that the magnetron 40 cannot be energized unless the door 35 is securely closed and locked, thereby protecting against the inadvertent escape of microwave energy from the heating enclosure 30. The interlock switch 52 is in turn connected to one movable contact 55A of a selector switch 55 which has four fixed switch contacts, respectively designated "OFF", "LO", "HI" and "BROIL", the selector switch 55 also having movable contacts 55B and 55C which are ganged with the movable contact 55A. The "HI" fixed contact for the movable contact 55A is connected by a conductor 53 to a choke coil 54 of a voltage quadrupler circuit 70, and is also connected by a conductor 56 to the movable contact 55B of the selector switch 55, the "LO" position fixed contact of which is connected to one terminal of the primary winding of a transformer 61, the other terminal of which winding is connected to neutral. The secondary coil of the transformer 61 is connected across the heater element of the magnetron 40.

Connected in parallel with the contact 55B of the selector switch 55 are a resistor 58 and the normally-closed contacts 59 of a relay coil 60. One terminal of the relay coil 60 is connected to the secondary of the transformer 61 and the other terminal thereof is connected through a capacitor 62 to the anode of the magnetron 40.

The "LO" fixed contact of the selector switch movable contact 55A is connected to the conductor 53 and is also connected by a conductor 63 to neutral through the parallel combination of a panel lamp 64 and a motor 65 for the blower 47. Connected in series between the "BROIL" contact of the selector switch movable contact 55A and neutral are the "BROIL" heating element 37 and the thermostat 38. The choke coil 54 is connected to the junction between two series-connected rectifiers 71 and 72, the other terminals of which are respectively connected in series to rectifiers 73 and 74. Connected across the rectifiers 71 and 72 is a series combination of two input capacitors 75 and 76, the junction therebetween being connected to neutral through the parallel combination of a thermistor 66, a resistor 67 and normally-open contacts 82 of the relay coil 60.

Connected across the rectifiers 71, 72, 73 and 74 is the series combination of two output capacitors 77 and 78, the junction therebetween being connected to the movable contact 55C of the selector switch 55, the "HI" fixed contact of which is designated by the numeral 80 and also forms a fixed contact of normally-open contacts 79 of the relay 60, the movable one of the contacts 79 being connected to the junction between the rectifiers 71 and 72. The output of the voltage quadrupler 70 is taken across the output capacitors 77 and 78, the junction between the capacitor 77 and the rectifier 73 being connected through magnet coils 68 and 69 to the anode of the magnetron 40, while the junction between the capacitor 78 and the rectifier 74 is connected to the junction between the relay coil 60 and the capacitor 62.

Referring now also to FIGS. 6 through 9 of the drawings, the operation of the microwave oven 20 will be described. In practice, a food load F is placed in the heating enclosure 30 in the position illustrated in FIG. 6. The door 35 is then closed, thereby closing the interlock switch 52 and permitting the electronic oven to be operated. At this point the control and power supply assembly 50 will be in the condition illustrated in FIG. 5, with the selector switch 55 in the "OFF" position. If it is desired to operate the microwave oven 20 on high power, the selector switch 55 is moved to the "HI" position. This results in energization of the panel lamp 64 and the blower motor 65 through the conductor 63, activation of the input voltage doubler portion of the voltage quadrupler 70 through the conductor 53 and energization of the transformer 61 through the normally-closed contacts 59 of the relay 60. The contact 55C of the selector switch 55 is moved to the fixed contact pole 80.

Thus, at start, a relatively low voltage from the input voltage doubler portion of the voltage quadrupler 70 is applied to the anode of the magnetron 40, while full heater power is maintained through the relay contacts 59. Initially, when the magnetron 40 conducts, the voltage across the resistor 67 heats the thermistor 66 causing a decrease in its resistance and, thereby, an increase in magnetron voltage. When the magnetron current reaches a predetermined value, the relay 60 will be actuated, thereby closing its normally-open contacts 79 and 82 and opening its normally-closed contacts 59.

Preferably, the relay contacts 82 close first, thereby shorting out the thermistor 66 and the resistor 67, resulting in an increase in voltage and current thereby to provide positive pull in of the relay 60. Closure of the relay contacts 79 activates the voltage quadrupler 70 through the selector switch contact 55C, thereby providing approximately 560 volts d.c. to the anode of the magnetron 40. Opening of the relay contacts 59 places the resistor 58 in series with the primary of the transformer 61 thereby reducing the heater current of the magnetron 40. The magnetron 40 is then operating on full high power and will continue in that mode of operation until the position of the selector switch 55 is changed.

When it is desired to operate the electronic oven 20 on low power, the selector swtich 55 is moved to the "LO" position, in which position the input voltage doubler portion of the voltage quadrupler 70, the panel lamp 64 and the blower motor 65 are all energized in the same manner as was described above with respect to the high power mode of operation. The primary of the transformer 61 is energized through the conductor 56 and the closed contacts 55B of the selector switch 55, as well as through the normally-closed contacts 59 of the relay 60. The startup of the magnetron 40 is the same as was described above in connection with the high power mode of operation, except that when the relay 60 is actuated the closure of the relay contacts 79 does not actuate the voltage quadrupler 70 because the selector switch contact 55C is out of contact with the pole 80, and the opening of the relay contacts 59 does not reduce the heater current, because the resistor 58 remains shorted out by the selector switch contact 55B.

When it is desired to broil or brown the food in the heating enclosure 30, the selector switch 55 is moved to the "BROIL" position, thereby de-energizing the magnetron 40 and energizing the broil heating element 37 through the thermostat 38.

It is a significant feature of the present invention that the voltage quadrupler 70 can be switched between a low power configuration which utilizes only the input voltage doubler portion and a high power configuration which activates the entire voltage quadrupler 70 for providing a maximum voltage to the anode of the magnetron 40. Furthermore, the voltage quadrupler 70 is so designed as to have an improved power factor which results from the use of the choke coil 54, and further by reason of the fact that the input capacitors 75 and 76 each have a capacitance C which is twice the capacitance of the output capacitors 77 and 78.

The microwave energy at the output of the magnetron 40 is transmitted through the coupler and filter member 43, the capacitive coupling 42 and the transmission line 41 to the antenna 44 which radiates the microwaves into the heating enclosure 30 for establishing therein a predetermined electromagnetic field pattern. It is an important feature of the present invention that the antenna 44 is so positioned, and the heating enclosure 30 is so dimensioned that two predetermined complementary electromagnetic field modes are established in the heating enclosure 30. The predetermined modes complement each other in that each mode has fields which vary in the directions in which the fields of the other mode are constant, thereby producing a composite electromagnetic field pattern which varies in all three dimensions of the heating enclosure 30. Those dimensions are such that only selected complementary modes are excited in the heating cavity, which modes will produce an undistorted field pattern which provides a uniform heating pattern greater than λ, where λ is the wavelength of the microwave energy generated at the magnetron 40. Furthermore, the variation of the electromagnetic fields in all three dimensions of the heating cavity facilitates the cooking of foods of various shapes and sizes.

Figure 6:
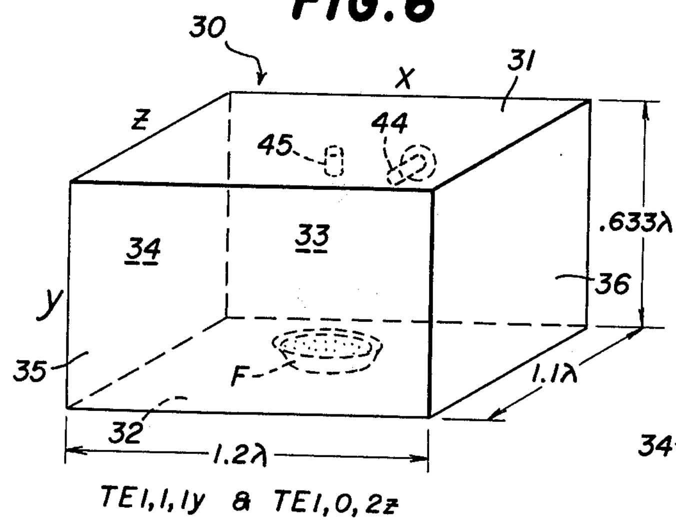
FIG. 6 is a diagrammatic transparent perspective view of the heating cavity of the electronic heating apparatus of FIG. 1 for producing two complementary electromagnetic field modes.

In the form of the heating enclosure 30 illustrated in FIG. 6, the dimensions of the heating cavity are in accordance with the relationships $$\lambda = \frac{2}{\sqrt{(1/x)^2 + (1/y)^2 + (1/z)^2}}$$

and $$z = \sqrt{3y}$$

wherein $x$ corresponds to the width of the heating cavity, $y$ corresponds to the height of the heating cavity and $z$ corresponds to the depth of the heating cavity. From these relationships it follows that:

$$\lambda = \frac{2}{\sqrt{(1/x)^2 + (2/z)^2}}$$

It has been found that when the heating enclosure 30 has dimensions according to these relationships, such that $x = 1.2\ \lambda$, $y = 0.633\ \lambda$ and $z = 1.1\ \lambda$, and when the antenna 44 is positioned as illustrated in FIG. 6 substantially midway between the side walls 34 and 36 and approximately $y/4$ from the top wall 31, there are produced in the heating cavity the $TE_{1,1,1y}$ and $TE_{1,0,2z}$ electromagnetic field modes, wherein the numeral subscripts represent, respectively, the field variations in the $s$, $y$ and $z$ directions, and the letter subscript indicates the direction of power flow.

Figure 7:
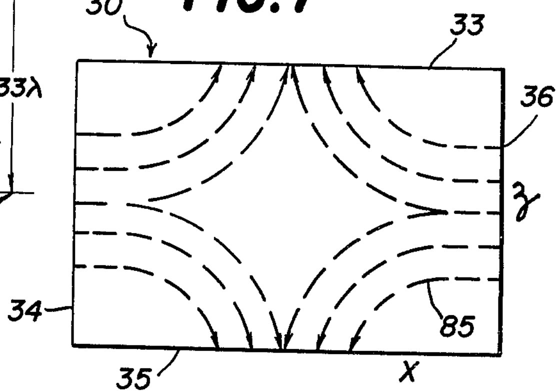
FIG. 7 is a diagrammatic top plan view of the heating cavity illustrated in FIG. 6, and showing the electric field pattern of the $TE_{1,1,1Y}$ mode therein.
Figure 8:
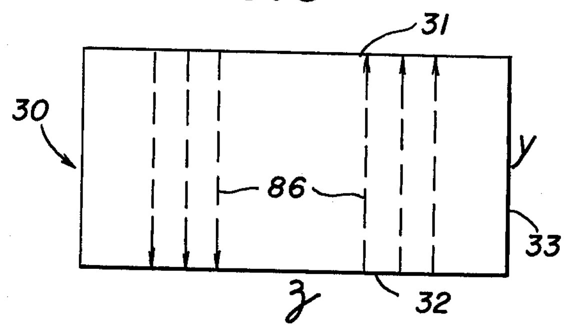
FIG. 8 is a diagrammatic side elevational view of the heating cavity shown in FIG. 6, illustrating the electric fields of the $TE_{1,0,2Z}$ mode therein.
Figure 9:
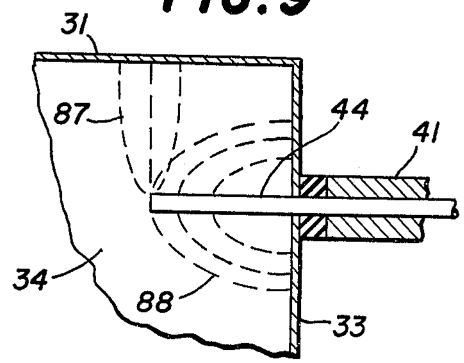
FIG. 9 is a fragmentary view in vertical section showing the antenna of the heating apparatus in FIGS. 1 and 2, and illustrating the vertical and horizontal fields thereof.

There is illustrated in FIG. 9 a side view of the horizontal and vertical fields at the antenna 44 in the heating enclosure 30 of FIG. 6. A top view of the electric fields of the $TE_{1,1,1y}$ mode established in the cavity of FIG. 6 is illustrated in FIG. 7 and is designated by the numeral 85, while a side view of the electric fields of the $TE_{1,0,2z}$ mode established in the heating enclosure of FIG. 6 is shown in FIG. 8 and is designated by the numeral 86. In practice it has been found that the $TE_{1,1,1y}$ mode provides heating of the outer portions of the food in the heating cavity, while the $TE_{1,0,2z}$ mode provides heating of the inner portions of the food. In order to enhance the uniform heating pattern of the complementary field modes established in the heating enclosure 30, the tuning element 45 is provided substantially centrally of the top wall 31 projecting downwardly into the heating cavity. The tuning element 45 is so designed and positioned that it does not couple the desired $TE_{1,1,1y}$ and $TE_{1,0,2z}$ modes, but it does couple undesired TE and TM (transverse magnetic) modes and tunes these undesired modes off resonance. At this point it should be noted that the dimensions of the heating cavity referred to herein are effective electrical dimensions and that, by reason of the effect of the tuning element 45, these electrical dimensions may differ from the mechanical dimensions of the heating enclosure.

A number of modifications of the present invention providing two complementary transverse electric modes which have the desired uniform heating pattern, as well as forms of heating apparatus having a single electric field mode are disclosed in the aforementioned U.S. Pat. No. 3,855,440.

In a constructional example of the control and power supply assembly 50 of the electronic oven 20, the input capacitors 75 and 76 of the voltage quadrupler 70 each have a capacitance of 500 microfarads, while each of the output capacitors 77 and 78 has a capacitance of 250 microfarads. The capacitor 62 has a capacitance of 60 microfarads, while the start resistor 67 has a resistance of 30 ohms. In use, the electronic oven 20 has operated satisfactorily in tests with the modes illustrated in FIG. 6, a cup of water placed anywhere in the $x$-$z$ plane of FIG. 6 having been heated with power equal to or greater than unity power of the magnetron 40. It has been found that small or large loads are equally well heated.

From the foregoing, it can be seen that there has been provided a novel electronic oven which affords uniform heating of a wide variety of food loads, without requiring any moving parts in the heating cavity.

More particularly, there has been provided an electronic heating apparatus wherein microwave energy is radiated into the heating cavity by a probe antenna, the placement of the probe antenna and the dimensions of the heating cavity being such as to provide excitation of two predetermined complementary electromagnetic field modes in the heating cavity which have fields varying in all three dimensions and provide a uniform heating pattern greater than one wavelength of the microwave energy.

There has also been provided a novel and improved magnetron power supply in an electronic oven of the character described, which power supply permits the magnetron to operate from normal low voltage household a.c. electric current.

More particularly, there has been provided a novel voltage quadrupler power supply for a magnetron, characterized by an improved power factor and means for switching the power supply between a low voltage mode and a high voltage mode of operation.

While there have been described what are at present considered to be the preferred embodiments of the invention, it will be understood that various modifications may be made therein, and it is intended to cover in the appended claims all such modifications as fall within the true spirit and scope of the invention.

What is claimed is:

1. Electronic heating apparatus comprising metal wall structure defining a heating cavity, an antenna galvanically insulated from said wall structure and arranged to radiate microwaves into said heating cavity, a crossed-field discharge device including a pair of input terminals and a pair of output terminals, said device being characterized by the production of an a.c. voltage of ultra-high frequency across the output terminals thereof in response to the application of a d.c. voltage across the input terminals thereof, means capacitively coupling said output terminals respectively to said metal wall structure and to said antenna, a voltage converter including a pair of input terminals adapted to be connected to an associated low frequency a.c. supply source having a voltage in the general range of 110 to 125 volts and a pair of output terminals respectively connected to the input terminals of said device, said voltage converter further including four series-connected rectifiers, two input capacitors connected in parallel with the inner two of said rectifiers, two output capacitors connected in parallel with said four rectifiers, the capacitance of each of said input capacitors being twice the capacitance of each of said output capacitors, and a choke coil having an input terminal adapted for connection to the associated source of low voltage a.c. power and an output terminal adapted for connection to a first junction between said two inner rectifiers and to a second junction between said two output capacitors, said converter being characterized by the production of a d.c. output voltage across the output terminals thereof in response to the application of a low frequency a.c. input voltage across the input terminals thereof, the maximum amplitude of the d.c. output voltage from said converter being approximately four times the peak value of the a.c. input voltage to said converter.

2. The electronic heating apparatus set forth in claim 1, and further including switching means coupled to said converter selectively to shift said converter between a low voltage configuration wherein the amplitude of the d.c. output voltage is approximately double the peak value of the a.c. input voltage to said converter and a high voltage configuration wherein the amplitude of the d.c. output voltage is approximately four times the peak value of the a.c. input voltage to said converter, said switching means in the low voltage configuration thereof disconnecting said first junction from said second junction, said switching means in the high voltage configuration thereof connecting said first junction to said second junction.

* * * * *